(12) United States Patent
Steiner et al.

(10) Patent No.: US 11,205,985 B2
(45) Date of Patent: Dec. 21, 2021

(54) MOTOR CONTROL DEVICE

(71) Applicant: Lutron Technology Company LLC, Coopersburg, PA (US)

(72) Inventors: James P. Steiner, Royersford, PA (US); Dinesh Sundara Moorthy, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/001,143

(22) Filed: Aug. 24, 2020

(65) Prior Publication Data

US 2020/0389112 A1    Dec. 10, 2020

Related U.S. Application Data

(63) Continuation of application No. 16/003,864, filed on Jun. 8, 2018, now Pat. No. 10,756,662.

(60) Provisional application No. 62/517,478, filed on Jun. 9, 2017.

(51) Int. Cl.
 *H02P 1/24* (2006.01)
 *H02P 25/04* (2006.01)
 (Continued)

(52) U.S. Cl.
 CPC .......... *H02P 25/04* (2013.01); *F21V 33/0096* (2013.01); *H01H 47/02* (2013.01);
 (Continued)

(58) Field of Classification Search
 CPC . H02P 25/04; H05B 37/0281; H05B 37/0245; H01H 47/02; H04B 3/54; H04B 2203/5412
 (Continued)

(56) References Cited

U.S. PATENT DOCUMENTS 4,326,153 A * 4/1982 Contri .................. H02P 25/145
                                                          388/820
4,352,993 A   10/1982 Hannas
(Continued)

FOREIGN PATENT DOCUMENTS

CA    2178026 A1   12/1996
CN   105763130 A    7/2016
DE    4421976 A1    1/1995

*Primary Examiner* — Eduardo Colon Santana
*Assistant Examiner* — Gabriel Agared
(74) *Attorney, Agent, or Firm* — Michael Czarnecki; Glen Farbanish; Philip Smith

(57) ABSTRACT

A load control device may control power delivered from a power source, such as an alternating-current (AC) power source, to at least two electrical loads, such as a lighting load and a motor load. The load control device may include multiple load control circuit, such as a dimmer circuit and a motor drive circuit, for controlling the power delivered to the lighting load and the motor load, respectively. The load control device may adjust the rotational speed of the motor load in a manner so as to minimize acoustic noise generated by the load control device and reduce the amount of time required to adjust the rotational speed of the motor load. The load control device may remain powered when one of the electrical loads (e.g., the lighting load) has been removed (e.g., electrically disconnected or uninstalled) and/or has failed in an open state (has "burnt out" or "blown out").

20 Claims, 6 Drawing Sheets

(51) Int. Cl.
    *H02P 27/16*     (2006.01)
    *H05B 47/16*     (2020.01)
    *H05B 47/175*     (2020.01)
    *F21V 33/00*     (2006.01)
    *H01H 47/02*     (2006.01)
    *H04B 3/54*     (2006.01)

(52) U.S. Cl.
    CPC ............... *H02P 1/24* (2013.01); *H02P 27/16* (2013.01); *H04B 3/54* (2013.01); *H05B 47/16* (2020.01); *H05B 47/175* (2020.01); *H04B 2203/5412* (2013.01)

(58) Field of Classification Search
    USPC ........................................................ 318/244
    See application file for complete search history.

(56) References Cited

U.S. PATENT DOCUMENTS

| | | | | |
|---|---|---|---|---|
| 5,731,681 | A * | 3/1998 | Inaniwa | H02M 5/4585 |
| | | | | 318/376 |
| 6,272,025 | B1 * | 8/2001 | Riggio | H02M 1/14 |
| | | | | 363/24 |
| 7,330,004 | B2 | 2/2008 | DeJonge et al. | |
| 7,489,094 | B2 | 2/2009 | Steiner et al. | |
| 7,671,549 | B2 | 3/2010 | Steiner et al. | |
| 8,193,744 | B2 | 6/2012 | Steiner et al. | |
| 8,664,881 | B2 | 3/2014 | Newman, Jr. et al. | |
| 8,698,408 | B2 | 4/2014 | Newman, Jr. | |
| 8,892,913 | B2 | 11/2014 | Newman, Jr. et al. | |
| 8,957,662 | B2 | 2/2015 | Newman, Jr. et al. | |
| 9,155,162 | B2 | 10/2015 | Zotter et al. | |
| 9,160,224 | B2 | 10/2015 | Newman, Jr. et al. | |
| 9,699,863 | B2 | 7/2017 | Weightman et al. | |
| 10,187,944 | B2 | 1/2019 | MacAdam et al. | |
| 10,756,662 | B2 | 8/2020 | Steiner et al. | |
| 2006/0255746 | A1 | 11/2006 | Kumar et al. | |
| 2007/0114963 | A1 * | 5/2007 | Steiner | H02P 7/288 |
| | | | | 318/772 |
| 2008/0111501 | A1 | 5/2008 | Dobbins et al. | |
| 2009/0039854 | A1 | 2/2009 | Blakeley | |
| 2011/0148202 | A1 * | 6/2011 | Rada | G05F 1/70 |
| | | | | 307/52 |
| 2012/0125894 | A1 * | 5/2012 | Heerdt | H01H 9/541 |
| | | | | 218/145 |
| 2015/0098164 | A1 | 4/2015 | Lenig et al. | |
| 2017/0318701 | A1 | 11/2017 | Steiner | |

* cited by examiner

MOTOR CONTROL DEVICE

CROSS-REFERENCE TO RELATED APPLICATIONS

This application is a continuation of U.S. patent application Ser. No. 16/003,864, filed on Jun. 8, 2018, which claims priority to U.S. Provisional Patent Application No. 62/517,478, filed Jun. 9, 2017, the entire disclosures of which are incorporated by reference herein.

BACKGROUND

Ceiling fans often include a motor for rotating the fan blades as well as a light source for illuminating the space in which the ceiling fan is mounted. In some installations, the ceiling fan may receive a single power feed and a single switch (e.g., a mechanical toggle switch installed in an electrical wallbox) may be used to control the power delivered from an alternating-current (AC) power source to both the motor and the light source. In other installations, the motor and the light source may receive separate power feeds and may be controlled independently by a wall-mounted control device. For example, a wall-mounted dual load control device may comprise a motor drive circuit connected to the motor of the ceiling fan via a first electrical wiring and a dimming circuit connected to the light source of the ceiling fan via a second electrical wiring.

The motor drive circuit may comprise one or more capacitors that may be electrically coupled in series with the motor to adjust the rotational speed of the motor to one or more rotational speeds (e.g., rotational speeds less than a maximum rotational speed). In some cases, the capacitors may be electrically coupled in parallel to provide one or more additional rotational speeds. If the capacitors are coupled in parallel when the voltages across the capacitors have different magnitudes, acoustic noise may be generated in the load control device (e.g., due to a large circulating current being generated in the capacitors), which can be bothersome to a user of the load control device. In addition, repetitive occurrences of the large circulating current may damage the capacitors and other electrical components of the load control device.

Some wall-mounted dual load control devices include digital control circuits (e.g., a processing circuit, such as a microprocessor) for controlling the motor drive circuit and the dimming circuit (e.g., using a phase-control dimming technique) and/or for providing advanced features or feedback to a user. Such wall-mounted dual load control devices typically each include a power supply for generating a supply voltage for powering the processing circuit. The power supply may be coupled in parallel with the dimming circuit and may be configured to conduct current through the light source to generate a direct-current (DC) supply voltage when a controllably conductive device of the dimming circuit is non-conductive each half-cycle of the AC power source. Since it may be undesirable to conduct current through the motor load when the motor is off, the power supply may be configured to conduct current through the light source in order to generate the supply voltage. If the light source is removed from the ceiling fan and/or has failed in an open circuit (e.g., is "burnt out" or "blown out"), the power supply will not be able to conduct current through the light source to generate the supply voltage and the microprocessor will be unpowered. As a result, the wall-mountable smart dual load control device become unpowered and thus will not be able to control the power delivered to the motor when the light source is removed from the ceiling fan and/or has failed in an open circuit.

SUMMARY

As described herein, a load control device (e.g., a dual load control device) may control power delivered from a power source, such as an alternating-current (AC) power source, to at least two electrical loads, such as a lighting load and a motor load. The load control device may comprise a first load control circuit (e.g., a dimmer circuit) for controlling the power delivered to the lighting load and a second load control circuit (e.g., a motor drive circuit) for controlling the power delivered to the motor load. The load control device may also comprise a control circuit that may control the first and second load control circuits to control the power delivered to the first and second electrical loads, respectively.

The load control device may adjust the rotational speed of the motor load in a manner so as to minimize acoustic noise generated by the load control device and reduce the amount of time required to adjust the rotational speed of the motor load. The motor drive circuit may comprise first and second capacitors, and first and second controllable switching circuits coupled in series with the first and second capacitors, respectively. The control circuit may control the first controllable switching circuit to electrically couple the first capacitor in series between the AC power source and the motor load to cause the motor load to rotate at a first rotational speed, and to control the second controllable switching circuit to electrically couple the second capacitor in series between the AC power source and the motor load to cause the motor load to rotate at a second rotational speed. The motor drive circuit may further comprise first and second resistors configured to be coupled in parallel with the first and second capacitors, respectively, when the respective capacitor is electrically coupled in series between the AC power source and the motor load.

When the control circuit receives a command to change the motor load from the first rotational speed to the second rotational speed, the control circuit is configured to control the first controllable switching circuit to disconnect the first capacitor from the series electrical connection between the AC power source and the motor load at approximately a first zero-crossing of the AC power source, wait for a wait time period to allow the first capacitor to discharge through the first resistor; and subsequently control the second controllable switching circuit to connect the second capacitor in series electrical connection between the AC power source and the motor load at approximately a second zero-crossing of the AC power source. In addition, the control circuit may be configured to cause the motor load to rotate at a third rotational speed by controlling the first and second controllable switching circuits to electrically couple the first and second capacitors in parallel electrical connection, where the parallel combination of the first and second capacitors is coupled in series electrical connection between the AC power source and the motor load. As a result of controlling the first and second switching circuits in this manner, the magnitude of a circulating current that may be conducted through the first and second capacitors when the first and second controllable switching circuit are rendered conductive may be reduced, which may prevent damage to the first and second capacitors and the first and second controllable switching devices.

In addition, the load control device may remain powered when one of the electrical loads (e.g., the lighting load) has been removed (e.g., electrically disconnected or uninstalled) and/or has failed in an open state (has "burnt out" or "blown out"). The load control device may comprise a power supply that may be coupled to conduct a charging current through the first electrical load (e.g., the lighting load) for generating a supply voltage. The load control device may further comprise a controllable switching circuit coupled to the power supply and configured to conduct the charging current through the second electrical load (e.g., the motor load). In response to determining that the charging current is not being conducted through the first electrical load, the control circuit may be configured to render the controllable switching circuit conductive to allow the power supply to conduct the charging current through the second electrical load. In addition, the control circuit may enter an error state and may turn off the second electrical load in response to determining that the charging current is not being conducted through the first electrical load. The control circuit may store present states of the first and second load control circuits in the memory when operating in the error state, and may to the first and second load control circuits according to the states stored in the memory when exiting the error state.

In addition, a method of controlling power delivered from an alternating-current (AC) power source to a motor load is disclosed herein. The method may comprise: (1) controlling a first controllable switching circuit to electrically couple a first capacitor in series between the AC power source and the motor load to cause the motor load to rotate at a first rotational speed; (2) controlling a second controllable switching circuit to electrically couple a second capacitor in series between the AC power source and the motor load to cause the motor load to rotate at a second rotational speed; and (3) changing the motor load from the first rotational speed to the second rotational speed by controlling the first controllable switching circuit to disconnect the first capacitor from the series electrical connection between the AC power source and the motor load at approximately a first zero-crossing of the AC power source, waiting for a wait time period to allow the first capacitor to discharge through a first resistor, and subsequently controlling the second controllable switching circuit to connect the second capacitor in series electrical connection between the AC power source and the motor load at approximately a second zero-crossing of the AC power source.

Further, a method of controlling power delivered from a power source to at least two electrical loads may comprise: (1) controlling first and second load control circuits to control the power delivered to the first and second electrical loads, respectively; (2) generating a supply voltage by conducting a charging current through the first electrical load; (3) determining that the charging current is not being conducted through the first electrical load; and (4) rendering a first controllable switching circuit conductive to allow the charging current to be conducted through the second electrical load in response to determining that the charging current is not being conducted through the first electrical load.

DETAILED DESCRIPTION

Figure 1:
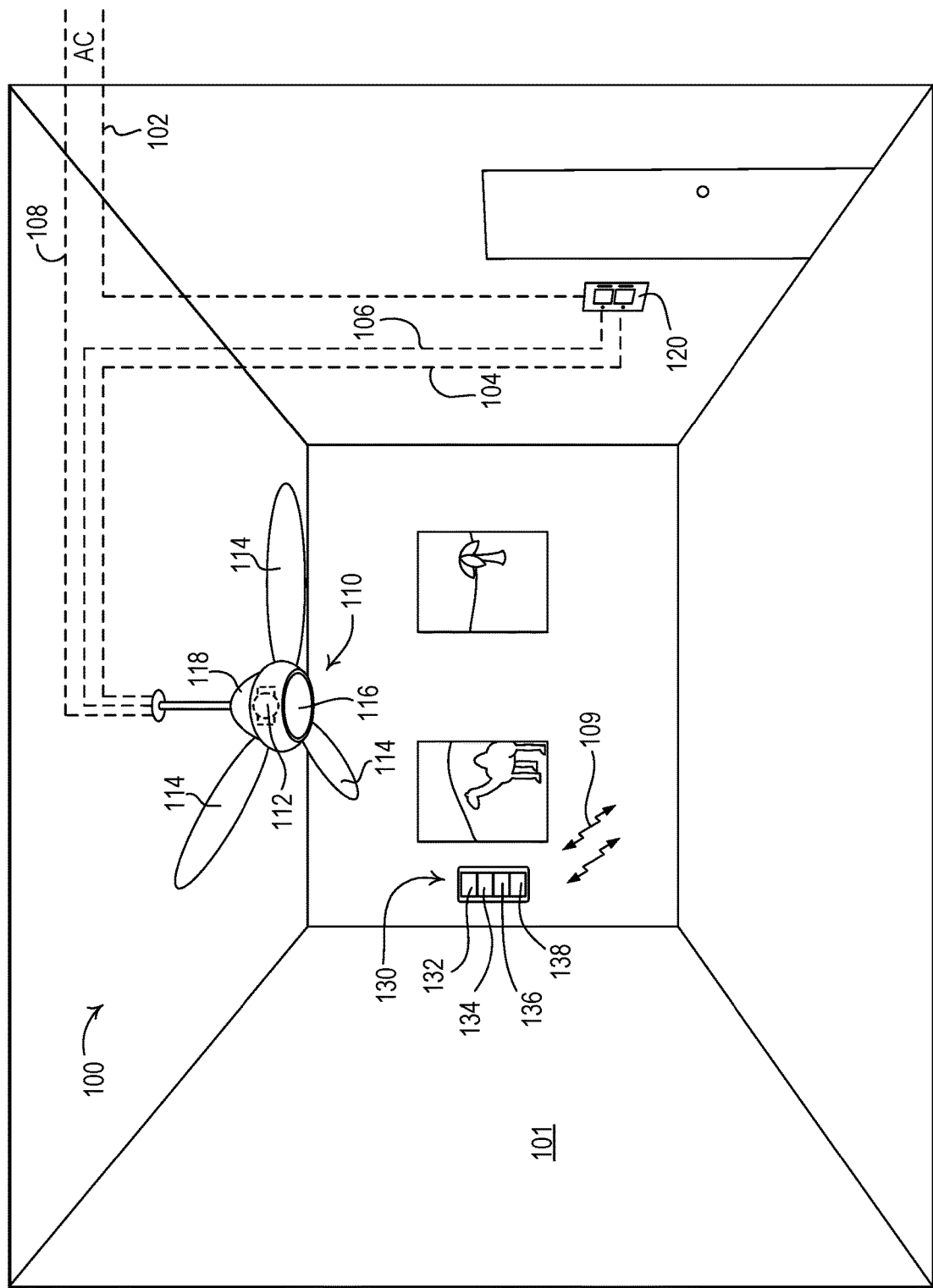
FIG. 1 is a diagram of an example load control system for controlling the operation of an electrical device, such as a ceiling fan.

FIG. 1 is a diagram of an example load control system 100 for controlling the operation of an electrical device, such as a ceiling fan 110. The ceiling fan 110 may receive power from a power source, such as an alternating-current (AC) power source or a direct-current (DC) power source. The ceiling fan 110 may be installed on the ceiling of a room 101 or space in a building. The ceiling fan 110 may comprise a motor load (e.g., a first electrical load), such as a fan motor 112, for rotating a plurality of blades 114 (e.g., three blades as shown in FIG. 1) to circulate the air in the room 101. The ceiling fan 110 may comprise a lighting load (e.g., a second electrical load), such as a light source 116, for illuminating the room 101. The ceiling fan 110 may also include a control device or circuit that may be housed in a base portion 118 and may control the motor 112 (e.g., to turn on and off, adjust the rotational speed, and/or control the direction of rotation of the motor) and the light source 116 (e.g., to turn on and off and/or adjust the intensity of the light source).

The load control system 100 may also comprise a dual load control device 120 for controlling (e.g., individually controlling) the motor 112 and the light source 116 of the ceiling fan 110. The dual load control device 120 may be configured to be electrically coupled between the power source and the ceiling fan 110. For example, the dual load control device 120 may be configured to receive a hot wiring 102 from a hot side of an AC power source as shown in FIG. 1. The dual load control device 120 may comprise first and second controlled outputs (e.g., a motor control output and a lighting control output) that may be coupled to the ceiling fan 110 through a motor control wiring 104 and a lighting control wiring 106, respectively, for individually controlling the motor 112 and the light source 116 of the ceiling fan. The ceiling fan 110 may also be coupled to a neutral side of the AC power source through a neutral wiring 108. The dual load control device may comprise one or more actuators for controlling the motor 112 (e.g., the on and off state and/or the rotational speed of the motor) and the light source 116 (e.g., the on and off state and/or the intensity of the light source).

The dual load control device 120 may be configured to receive wired or wireless signals, such as radio-frequency (RF) signals 109, for controlling the motor 112 and/or the light source 116 of the ceiling fan 110. The load control system 100 may comprise a remote control device 130 (e.g., a battery-powered RF remote control) for transmitting RF signals 109 including commands for controlling the motor 112 and/or the light source 116 of the ceiling fan 110 in response to actuations of a plurality of buttons, e.g., an increase-light-intensity button 132, a decrease-light-intensity button 134, an increase-rotational-speed button 136, and a decrease-rotational-speed button 138. The control device of the ceiling fan 110 may be configured to turn on and/or raise the intensity of the light source 116 in response to actuations of the increase-light-intensity button 132. The control device of the ceiling fan 110 may be configured to turn off and/or lower the intensity of the light source 116 in response to actuations of the decrease-light-intensity button 134. The control device of the ceiling fan 110 may be configured to turn on and/or increase the rotational speed of the motor 112 in response to actuations of the increase-rotational-speed button 136. The control device of the ceiling fan 110 may be configured to turn off and/or decrease the rotational speed of the motor 112 in response to actuations of the decrease-rotational-speed button 138. The remote control device 130 may comprise additional buttons for selecting presets and/or separately turning on and off and/or adjusting the power delivered to the motor 112 and the light source 114. One will recognize that the control device of the ceiling fan 110 may also and/or alternatively be configured to receive control signals from a control device via a wired communication link.

The operation of the load control system 100 (e.g., the operation of the ceiling fan 110) may be programmed and configured using, for example, the mobile device or other network device (e.g., when the mobile device is a personal computing device). The mobile device may execute a graphical user interface (GUI) configuration software for allowing a user to program how the load control system 100 will operate. For example, the configuration software may run as a PC application or a web interface. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, filed Mar. 14, 2013, entitled COMMISSIONING LOAD CONTROL SYSTEMS, the entire disclosures of which are incorporated by reference herein.

Figure 2:
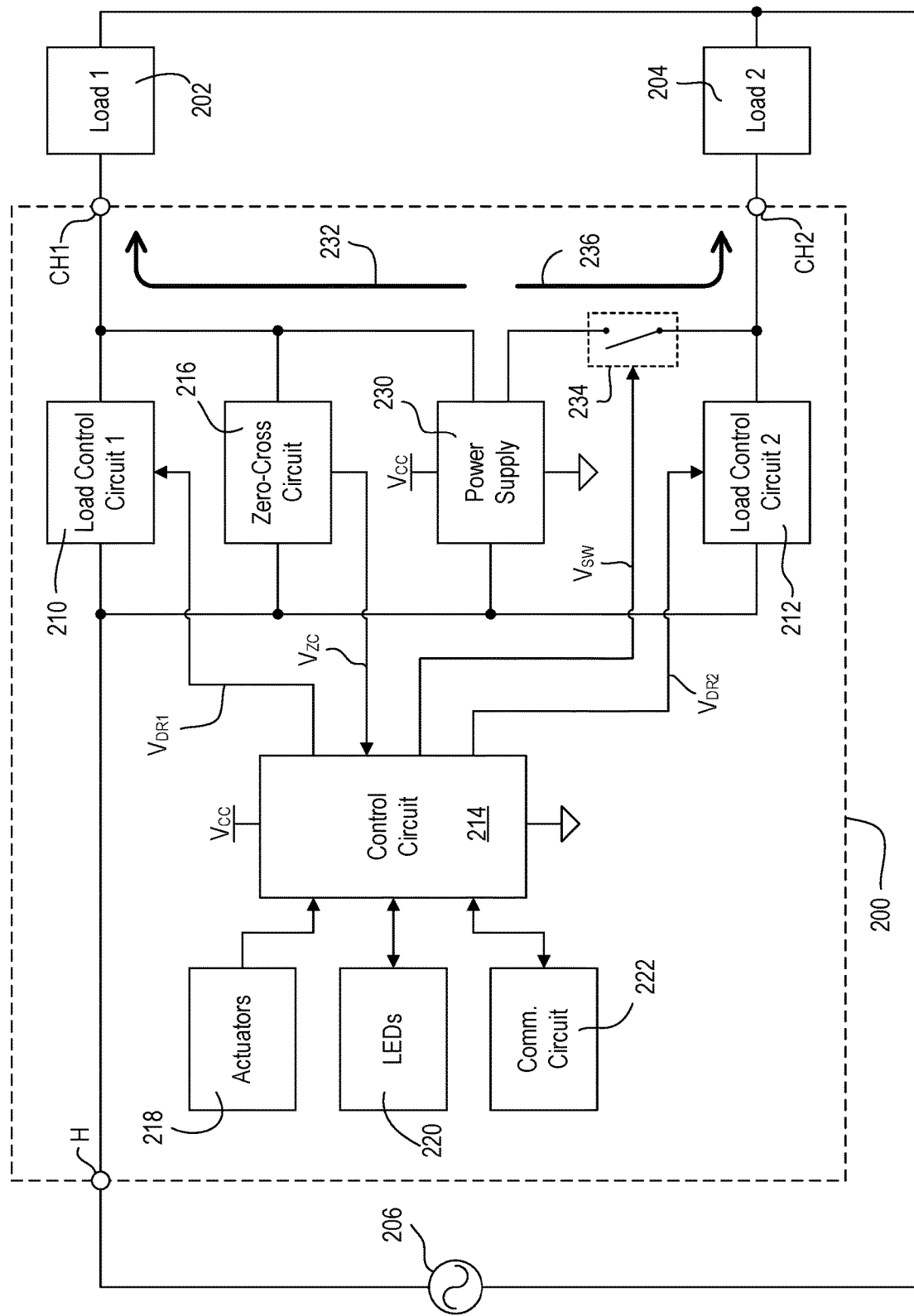
FIG. 2 is a simplified block diagram of an example dual load control device.

FIG. 2 is a simplified block diagram of an example load control device 200 (e.g., a dual load control device), which may be deployed as the dual load control device 120 of the load control system 100 shown in FIG. 1. The load control device 200 may be configured to control the power (e.g., the amount of power) delivered to first and second electrical loads 202, 204 (e.g., a light source and a motor, respectively, of a ceiling fan, such as the ceiling fan 110 shown in FIG. 1). The load control device 200 may have a hot terminal H adapted to be coupled to an alternating-current (AC) power source 206 for receiving an AC mains line voltage $V_{AC}$. The load control device 200 may also comprise a first controlled-hot terminal CH1 (e.g., a light control or dimmed hot terminal) adapted to be coupled to the first electrical load 202 and a second controlled-hot terminal CH2 adapted to be coupled to the second electrical load 204.

The load control device 200 may comprise a first load control circuit 210 (e.g., a dimmer circuit) coupled between the hot terminal H and the first controlled hot terminal CH1 for controlling the power delivered to the first electrical load 202 (e.g., the light source). The load control device 200 may comprise a second load control circuit 212 (e.g., a motor control circuit) coupled between the hot terminal H and the second controlled hot terminal CH2 for controlling the power delivered to the second electrical load 204 (e.g., the motor). The load control device 200 may also comprise a control circuit 214 coupled to the first and second load control circuits 210, 212, for controlling the respective electrical loads. The control circuit 214 may include one or more of a processor (e.g., a microprocessor), a microcontroller, a programmable logic device (PLD), a field programmable gate array (FPGA), an application specific integrated circuit (ASIC), or any suitable controller or processing device. The load control device 200 may comprise a memory (not shown) configured to store operational characteristics of the load control device (e.g., present states of the first and second load control circuits 210, 212, etc.). The memory may be implemented as an external integrated circuit (IC) or as an internal circuit of the control circuit 214.

The load control device 200 may further comprise a zero-cross detect circuit 216 coupled in parallel with the first load control circuit 210. The zero-cross detect circuit 216 may generate a zero-cross control signal $V_{ZC}$ representative of the zero-crossing points of the AC line voltage $V_{AC}$ of the AC power source 206 in response to a voltage developed across the first load control circuit 210. The control circuit 214 may receive the zero-cross control signal $V_{ZC}$ for controlling the first and second load control circuits 210, 212 relative to the zero-crossings of the AC line voltage $V_{AC}$.

The control circuit 214 may generate a first drive signal $V_{DR1}$ (e.g., one or more drive signals) for controlling the first load control circuit 210. The first load control circuit 210 may comprise a controllably conductive device, for example, a relay and/or a bidirectional semiconductor switch, such as, a triac, a field-effect transistor (FET) in a rectifier bridge, two FETs in anti-series connection, one or more insulated-gate bipolar junction transistors (IGBTs), or other suitable semiconductor switching circuit. The control circuit 214 may be configured to control the first load control circuit 210 to turn the first electrical load 202 on and off. The control circuit 214 may be configured to render the controllably conductive device of the first load control circuit 210 conductive and/or non-conductive at predetermined times relative to the zero-crossing points of the AC waveform (e.g., in response to the zero-cross control signal $V_{ZC}$) using a phase-control dimming technique (e.g., a forward phase-control dimming technique and/or a reverse phase-control dimming technique) to adjust the amount of power delivered to the first electrical load (e.g., to adjust the intensity of a light source).

The control circuit 214 may generate a second drive signal $V_{DR2}$ (e.g., one or more drive signals) for controlling the second load control circuit 212. The control circuit 214 may be configured to control the second load control circuit 212 to turn the second electrical load 204 on and off. The control circuit 214 may be configured to control the second load control circuit 212 to control the amount of power delivered to the second electrical load 204. For example, the control circuit 214 be configured to control the second load control circuit 212 to control the rotational speed and/or direction of the motor. The control circuit 214 may be configured to control the rotational speed to one or more discrete motor speeds between a minimum speed and a maximum speed. In addition, the control circuit 214 may be configured to continuously vary the rotational speed of the motor between the minimum speed and the maximum speed. The control circuit 214 may be configured to control the second load control circuit 212 relative to the zero-crossings of the AC line voltage $V_{AC}$.

The load control device 200 may further comprise one or more actuators 218 for receiving user inputs. The control circuit 214 may be configured to control the first and second load control circuits 210, 212 in response to actuations of the actuators 218. For example, the control circuit 214 may be configured to turn on and off and/or adjust an intensity of a light source controlled by the first load control circuit 210 in response to actuations of the actuators 218. In addition, the control circuit 214 may be configured to control the rotational speed and/or direction of a motor controlled by the second load control circuit 212 in response to actuations of the actuators 218. The control circuit 214 may wait for a timeout period $T_{TIMEOUT}$ (e.g., approximately 500 milliseconds) after the last command for controlling the motor was received (e.g., after the last actuation of the actuators) to adjust the rotational speed of the motor before controlling the second load control circuit 212 to adjust the rotational speed of the motor.

The load control device 200 may further comprise one or more visual indicators, such as light-emitting diodes (LEDs) 220, for providing visual feedback to a user of the load control device. For example, the control circuit 214 may be configured to illuminate the LEDs 220 to provide feedback of a present intensity of a light source controlled by the first load control circuit 210 and/or a present rotational speed of a motor controlled by the second load control circuit 212.

The load control device 200 may comprise a communication circuit 222. The communication circuit 222 may comprise a wireless communication circuit, such as, for example, a radio-frequency (RF) transceiver coupled to an antenna for transmitting and/or receiving RF signals, an RF transmitter for transmitting RF signals, an RF receiver for receiving RF signals, or an infrared (IR) transmitter and/or receiver for transmitting and/or receiving IR signals. The communication circuit 222 may also comprise a wired communication circuit configured to be coupled to a wired control link, for example, a digital communication link and/or an analog control link, such as a 0-10V control link or a pulse-width modulated (PWM) control link. The communication circuit 222 of the load control device 200 may also be responsive to one or more maintained switches and/or momentary switches. In addition, the communication circuit 222 may be coupled to the electrical wiring connected to the load control device 200 for transmitting a control signal via the electrical wiring using, for example, a power-line carrier (PLC) communication technique. An example of a load control system having control device configured to transmit control signals via electrical wiring is described in greater detail in commonly-assigned U.S. Pat. No. 8,471,687, issued Jun. 25, 2013, entitled METHOD AND APPARATUS FOR COMMUNICATING MESSAGE SIGNALS IN A LOAD CONTROL SYSTEM, the entire disclosure of which is incorporated by reference herein.

The load control device 200 may also include a power supply 230. The power supply 230 may generate a direct-current (DC) supply voltage $V_{CC}$ for powering the control circuit 214 and the other low-voltage circuitry of the load control device 200. The power supply 230 may be coupled in parallel with the first load control circuit 210. The power supply 230 may be configured to conduct a charging current through the first electrical load 202 to generate the supply voltage $V_{CC}$ (e.g., through a first charging path 232 as shown in FIG. 2). When the power supply 222 is conducting the charging current through the first electrical load 202, the zero-cross detect circuit 216 will generate indications of the zero-crossings of the AC waveform in the zero-cross control signal $V_{ZC}$.

If the first electrical load 202 fails as an open circuit (e.g., the light source is "burnt out" or "blown out") and/or the first electrical load 202 is removed, the first charging path 232 may be interrupted and the power supply 230 may not be able to charge through the first electrical load. The control circuit 214 may be configured to detect if the first electrical load 202 is failed or missing in response to the zero-cross detect signal $V_{ZC}$ since the charging current cannot be conducted through the first electrical load. For example, if the control circuit 214 determines at the zero-crossings are not present in the zero-cross detect signal $V_{ZC}$ for a predetermined number of consecutive half-cycles (e.g., four consecutive half-cycles), the control circuit 214 may determine that the first electrical load 202 is failed or missing.

The load control device 200 may further comprise a switching circuit 234 coupled between the power supply 230 and the second controlled hot terminal CH2. The control circuit 214 may generate a switch control signal $V_{SW}$ for rendering the switching circuit 234 conductive and non-conductive. During normal operation (e.g., when the first electrical load 202 is present), the control circuit 214 may render the switching circuit 234 non-conductive to allow the power supply to conduct the charging current through the first electrical load 202 (e.g., through the first charging path 232). When the control circuit 214 determines that the first electrical load 202 is failed or missing, the control circuit may be configured to close the switching circuit 234 to allow the power supply 230 to conduct the charging current through the switching circuit 234 and the second electrical load 204 (e.g., through a second charging path 236 as shown in FIG. 2). Since the second electrical load 204 may be a motor, the control circuit 214 may be configured to turn the second electrical load off when the switching circuit 234 is conductive and the charging current is being conducted through the second electrical load 204.

Figure 3:
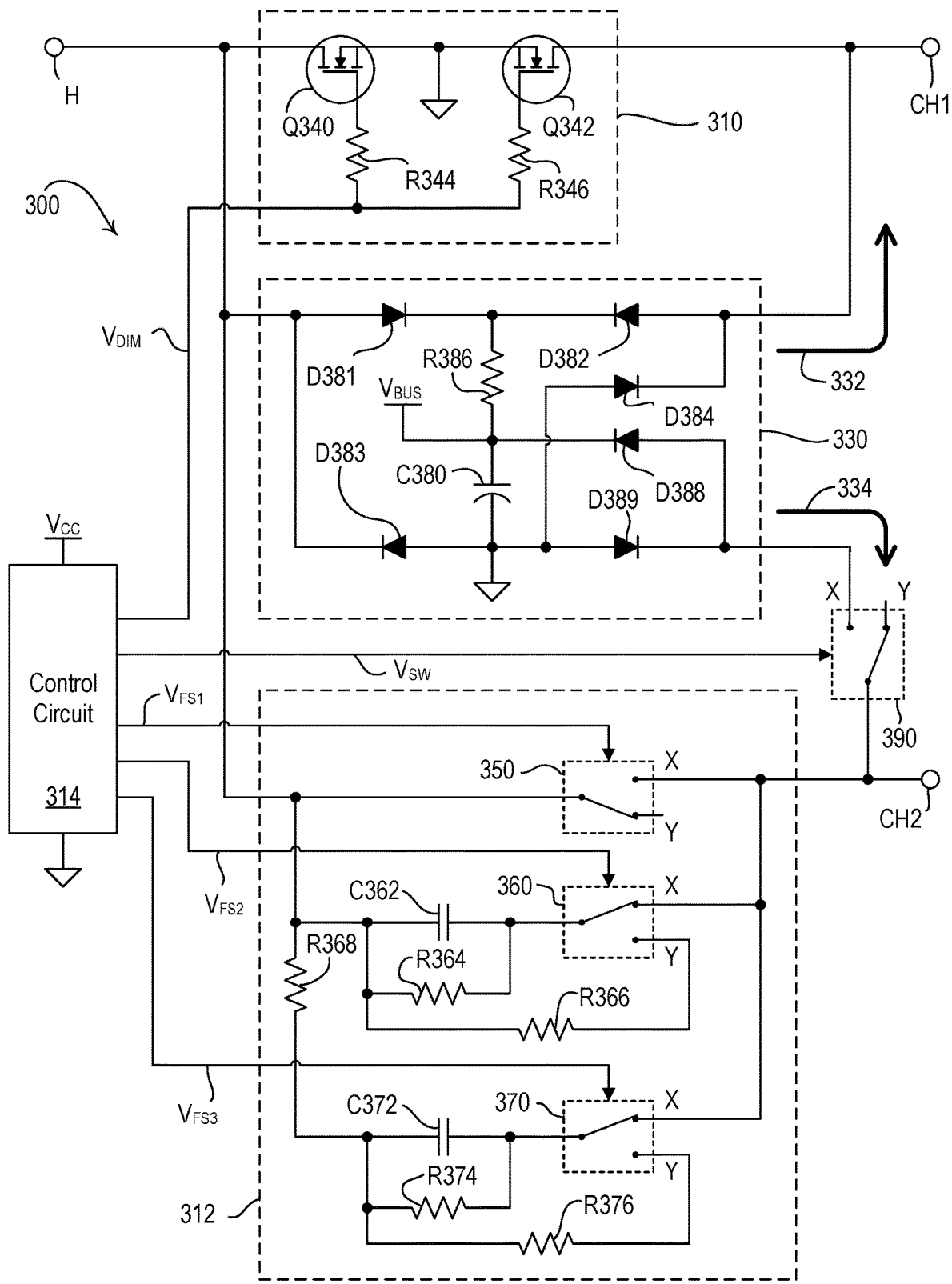
FIG. 3 is a simplified schematic diagram of an example dual load control device.

FIG. 3 is a simplified schematic diagram of an example load control device 300 (e.g., the dual load control device 120 of FIG. 1 and/or the load control device 200 of FIG. 2) for controlling the amount of power delivered to multiple electrical loads (e.g., a light source and a motor, respectively, of a ceiling fan). The load control device 300 may have a hot terminal H adapted to be coupled to a power source (e.g., the AC power source 206) for receiving an AC mains line voltage. The load control device 300 may also comprise a first controlled-hot terminal CH1 (e.g., a light control or dimmed hot terminal) adapted to be coupled to a first electrical load (e.g., the first electrical load 202, such as a light source) and a second controlled-hot terminal CH2 adapted to be coupled to a second electrical load (e.g., the second electrical load 204, such as a motor).

The load control device 300 may comprise a first load control circuit 310 (e.g., a dimmer circuit) electrically coupled between the hot terminal H and the first controlled hot terminal CH1 for controlling the power delivered to the first electrical load (e.g., the light source). The load control device 300 may comprise a second load control circuit 312 (e.g., a motor control circuit) electrically coupled between the hot terminal H and the second controlled hot terminal CH2 for controlling the power delivered to the second electrical load (e.g., the motor). The load control device 300 may also comprise a control circuit 314 coupled to the first and second load control circuits 310, 312, for controlling the respective electrical loads. The control circuit 314 may include one or more of a processor (e.g., a microprocessor), a microcontroller, a programmable logic device (PLD), a field programmable gate array (FPGA), an application specific integrated circuit (ASIC), or any suitable controller or processing device. The load control device 300 may further comprise a zero-cross detect circuit (not shown) coupled in parallel with the first load control circuit 310 for generating a zero-cross control signal representative of the zero-crossing points of the AC line voltage of the AC power source.

The first load control circuit 310 may comprise a controllably conductive device, such as two field-effect transistors (FETs) Q340, Q342 that are coupled in anti-series connection between the hot terminal H and the first controlled hot terminal CH1. The junction of the FETs Q340, Q342 may be coupled to circuit common. The controllably conductive device of the first load control circuit 310 may further comprise, for example, a thyristor (such as a triac), a field-effect transistor (FET) in a rectifier bridge, one or more insulated-gate bipolar junction transistors (IGBTs), or other suitable bidirectional semiconductor switch. The control circuit 314 may generate a dimming control signal $V_{DIM}$ for controlling the FETs Q340, Q342 of the first load control circuit 310 to conduct a first load current $I_{LOAD1}$ through the first electrical load. The dimming control signal $V_{DIM}$ may be coupled to the gates of the FETs Q340, Q342 via respective gate resistors R344, R346. The control circuit 314 may be configured to render the FETs Q340, Q342 conductive and/or non-conductive at predetermined times relative to the zero-crossing points of the AC waveform (e.g., in response to the zero-cross detect circuit) using a forward phase-control dimming technique and/or a reverse phase-control dimming technique to adjust the amount of power delivered to the first electrical load (e.g., to adjust the intensity of a light source). During the positive half-cycles of the AC power source, the first load current $I_{LOAD1}$ may be conducted through the drain-source channel of the first FET Q340 and a body diode of the second FET Q342. During the negative half-cycles of the AC power source, the first load current $I_{LOAD1}$ may be conducted through the drain-source channel of the second FET Q342 and a body diode of the first FET Q340.

The control circuit 314 may generate a plurality of fan speed control signals $V_{FS1}$, $V_{FS2}$, $V_{FS3}$ for controlling the second load control circuit 312 to control the second electrical load to a plurality of discrete power levels (e.g., a plurality of discrete rotational speeds of a motor, such as a motor of a ceiling fan). The second load control circuit 312 may comprise a first switching circuit, such as a first single-pole double-throw (SPDT) relay 350, coupled between the hot terminal H and the second controlled hot terminal CH2. The control circuit 314 may generate the first fan speed control signal $V_{FS1}$ for switching the first relay 350 between a first position X (e.g., in which a movable contact of the relay is connected to a first stationary contact) and a second position Y (e.g., in which the movable contact of the relay is connected to a second stationary contact). When the first relay 350 is controlled to the first position X, the AC line voltage may be coupled across the second electrical load, such that the second electrical load is controlled to a full power level (e.g., the motor of the ceiling fan is controlled to a maximum rotational speed or full speed). While the first relay 350 is shown as a SPDT relay in FIG. 3, the first relay could be replaced by a single-pole single-throw (SPST) relay.

The second load control circuit 312 may further comprise second and third switching circuits, such as respective SPDT relays 360, 370, that are coupled in series with respective capacitors C362, C372 between the hot terminal H and the second controlled hot terminal CH2. The control circuit 314 may generate the second and third fan speed control signals $V_{FS2}$, $V_{FS3}$ for switching each of the respective relays 360, 370 between a first position X and a second position Y. The first and second capacitors C362, C372 may have different capacitances, e.g., 3.3 μF and 5.6 μF, respectively. When the second relay 360 is controlled to the first position X, the first capacitor C362 may be coupled in series electrical connection between the AC power source and the second electrical load. When the third relay 370 is controlled to the first position X, the second capacitor C372 may be coupled in series electrical connection between the AC power source and the second electrical load.

When only the first capacitor C362 is coupled in series with the second electrical load (e.g., the second relay is in position X and the first and third relays 350, 370 are in position Y), the second electrical load may be controlled to a first intermediate power level (e.g., the motor of the ceiling fan may be controlled to a first intermediate rotational speed). When only the second capacitor C372 is coupled in series with the second electrical load (e.g., the third relay is in position X and the first and second relays 350, 370 are in position Y), the second electrical load may be controlled to a second intermediate power level (e.g., the motor of the ceiling fan may be controlled to a second intermediate rotational speed). When both of the first and second capacitors C362, C372 are coupled in series with the second electrical load (e.g., the second and third relays are in position X and the first relay 350 is in position Y), the second electrical load may be controlled to a third intermediate power level (e.g., the motor of the ceiling fan may be controlled to a third intermediate rotational speed). The control circuit 314 may be configured to turn off the second electrical load by controlling all of the relays 350, 360, 370 of the second load control circuit 310 to the second position Y.

The second load control circuit 310 may comprise resistors R364, R374 coupled in parallel with the capacitors C362, C372, respectively, for allowing the capacitors C362, C372 to discharge when the relays 360, 370 are in either the first position X or the second position Y. The second load control circuit 310 may further comprise resistors R366, R376, that may be coupled in parallel with the capacitors C362, C372, respectively, when the respective relays 360, 370 are in the second position Y. The resistors R366, R376 may have smaller resistances than the resistors R364, R374 to allow the respective capacitors C362, C372 to discharge at a faster rate when the relays 360, 370 are in the second position Y. The resistors R366, R376 may be coupled in parallel with the respective capacitors C362, C372 to discharge the capacitors when the capacitors are not electrically coupled in series between the between the AC power source and the second electrical load (e.g., when the relays 360, 370 are in the second position Y). The second load control circuit 310 may further comprise a resistor R368 coupled between the first and second capacitors C362, C372 for limiting the magnitude of a circulating current that may flow through the capacitor C362, C372 when both of the relays 360, 370 are controlled to the first position X.

The SPDT relays 360, 370 could each be replaced by two SPST relays. The first SPST relay of each pair may be controlled by one of the second and third fan speed control signals $V_{FS2}$, $V_{FS3}$ and the second SPST relay may be controlled by the inverse of the one of the second and third fan speed control signals $V_{FS2}$, $V_{FS3}$. In addition, the control circuit 314 may generate additional fan speed control signals for controlling the SPST relays.

The control circuit 314 may control the relays 360, 370 to attempt to couple the first and second capacitor C362, C372 in and out of the second load control circuit 310 (e.g., by changing the relays between the first position X and the second position Y) at approximately the zero-crossings of the AC power source. This may reduce the magnitudes of the currents conducted through the capacitors C362, C372 when the relays are changed to from the first position X to the second position Y and vice versa. The control circuit 314 may be configured to determine the timing of when to control the relays 360, 370 in response to the zero-crossings of the AC power source as determined from the zero-cross detect circuit. For example, when turning off the second electrical load, the control circuit 314 may control all of the relays 350, 360, 370 to position Y at a subsequent zero-crossing. When turning on the second electrical load (e.g., to one of the speeds, such as the maximum rotational speed or the first, second, or third intermediate rotational speeds), the control circuit 314 may control the appropriate relays for the desired rotational speed to position X at a subsequent zero-crossing.

When changing the power level of the second electrical load from one level to another (e.g., to change the rotational speed of the motor from one speed to another speed), the control circuit 314 may first control all of the relays 350, 360, 370 to position Y at a subsequent zero-crossing. The control circuit 314 may then wait for a wait time period $T_{WAIT}$ (e.g., approximately 0.5 seconds) to allow the capacitors C362, C374 to discharge through the resistors R366, R376 (e.g., at the faster rate than the capacitors could discharge through the respective resistors R364, R374). After the wait time period $T_{WAIT}$, the control circuit 314 may control the appropriate relays for the desired rotational speed to position X at a subsequent zero-crossing.

The load control device 300 may comprise a power supply 330 for generating a direct-current (DC) supply voltage $V_{CC}$ for powering the control circuit 314 and the other low-voltage circuitry of the load control device 300. The power supply 330 may be coupled in parallel with the first load control circuit 310 to conduct a charging current through the first load electrical load (e.g., through a first charging path 332 as shown in FIG. 3) to charge an energy storage capacitor C380 of the power supply 330 when the FETs Q340, Q342 of the first load control circuit 310 are non-conductive each half-cycle. The energy storage capacitor C380 may be coupled to the hot terminal H and the first controlled hot terminal CH1 through a full-wave rectifier bridge that includes diodes D381, D382, D383, D384. The diodes D383, D384 could be the body diodes of the FETs Q340, Q342, respectively, of the first load control circuit 310. The energy storage capacitor C380 may also be coupled in series with a resistor R386 on the DC side of the rectifier bridge and may produce a DC bus voltage $V_{BUS}$ (e.g., approximately 170V). The power supply may comprise a second stage (not shown) for generating the supply voltage $V_{CC}$ from the bus voltage $V_{BUS}$ (e.g., a linear regulator, a switching power supply, such as a buck converter, or other suitable power supply circuit for generating a low-magnitude DC supply voltage).

The load control device 300 may further comprise a switching circuit, such as a SPDT relay 390 coupled between the power supply 330 and the second controlled hot terminal CH2. The control circuit 314 may generate a switch control signal $V_{SW}$ for switching the relay 390 between a first position X and a second position Y. When the relay 390 is controlled to the first position X, the energy storage capacitor C380 of the power supply 380 may be configured to charge through the second controlled hot terminal CH2 and the second electrical load via diodes D388, D389 of the power supply 330 (e.g., through a second charging path 334 as shown in FIG. 3). While the relay 390 is shown as a SPDT relay in FIG. 3, the first relay could be replaced by a SPST relay.

The control circuit 314 may be configured to determine if the first electrical load is failed or missing (e.g., in response to the zero-cross detect circuit coupled across the first load control circuit 310) and control the relay 390 to allow the energy storage capacitor C380 of the power supply 330 to charge through the second electrical load. When the first electrical load is present, the control circuit 314 may control the relay 390 to the second position Y to allow the power supply 330 to conduct the charging current through the first electrical load. In response to determining that the first electrical load is failed or missing, the control circuit 314 may be configured to control the relay 390 to the first position X to allow the energy storage capacitor C380 power supply 330 to conduct the charging current through the relay 390 and the second electrical load (e.g., through the second charging path 334).

Figure 4:
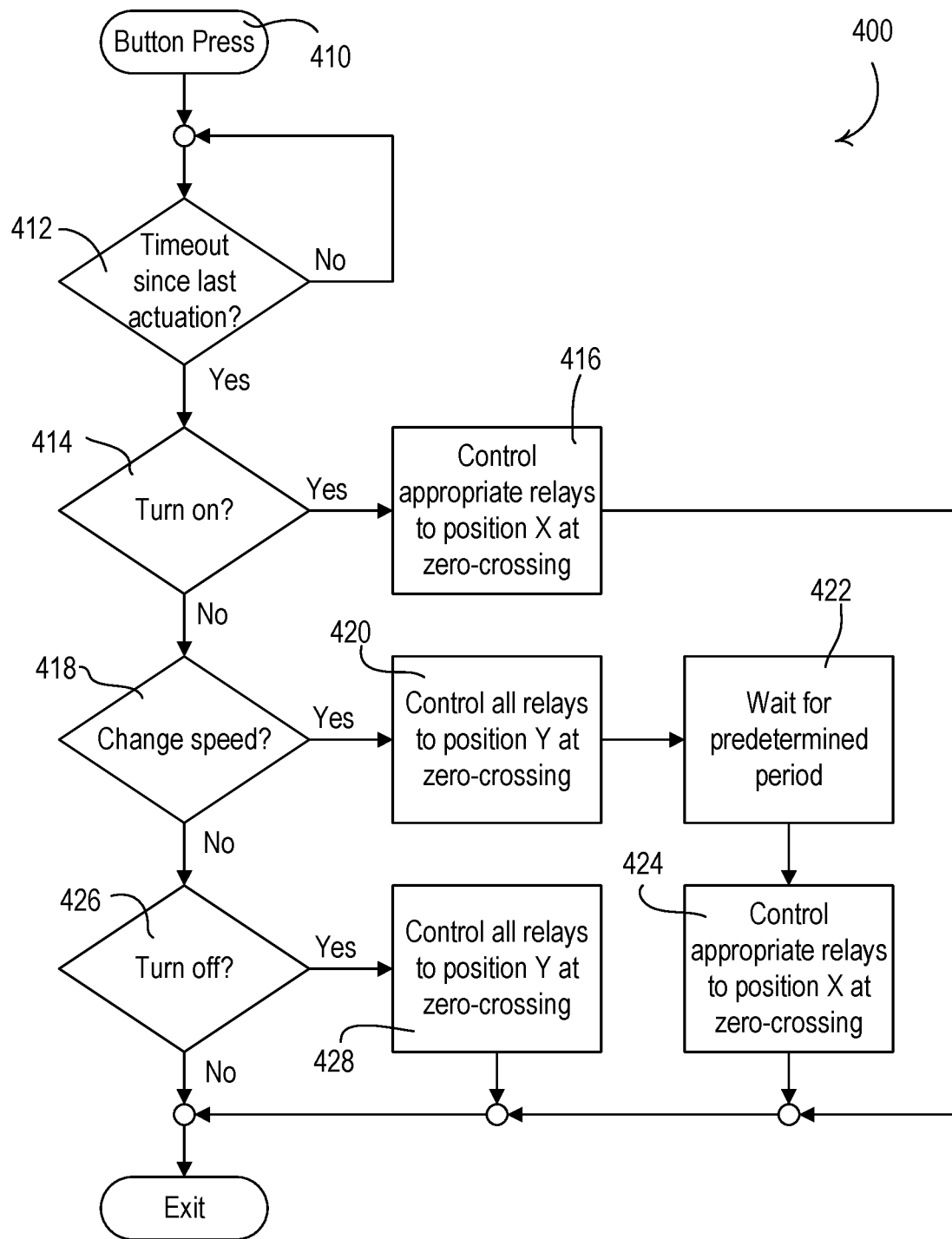
FIG. 4 is a simplified flowchart of an example actuator procedure.

FIG. 4 is a simplified flowchart of an example actuator procedure 400 that may be executed by a control circuit of a load control device (e.g., a control circuit of the dual load control device 120, the control circuit 214 of the load control device 200, and/or the control circuit 314 of the load control device 300). The control circuit may execute the actuator procedure 400 to control a plurality of relays of a load control circuit (e.g., the relays 350, 360, 370 of the second load control circuit 312 shown in FIG. 3) to control an electrical load, such as a motor of a ceiling fan in response to actuations of one or more of a plurality of actuators (e.g., the actuators 218). For example, the control circuit may execute the actuator procedure 400 in response to detecting an actuation of one the actuators at 410. The control circuit may first wait for a timeout period $T_{TIMEOUT}$ (e.g., approximately 500 milliseconds) after the last actuation of the actuators at 412 before attempting to adjust the rotational speed of the motor.

When the timeout period $T_{TIMEOUT}$ since the last actuation expires at 412 and the last actuation indicated a command to turn the motor on at 414 (e.g., to turn the motor on from off), the control circuit may control the appropriate relays for the desired rotational speed (e.g., such as a maximum rotational speed or an intermediate rotational speeds) to position X at a subsequent zero-crossing at 416, before the actuator procedure 400 exits. If the last actuation indicated a command to change the rotational speed of the motor at 418 (e.g., to change the speed of the motor from a first non-off speed to a second non-off speed), the control circuit may control all of the relays to position Y at a subsequent zero-crossing at 420. The control circuit may wait for a wait time period $T_{WAIT}$ (e.g., approximately 0.5 seconds) at 422 and then control the appropriate relays for the desired rotational speed to position X at a subsequent zero-crossing at 424, before the actuator procedure 400 exits. If the last actuation indicated a command to turn off the motor at 426 (e.g., to turn the motor off from on), the control circuit may control all of the relays to position Y at a subsequent zero-crossing at 428 and the actuator procedure 400 may exit.

As illustrated in FIG. 4, the control procedure 400 may only require two switching events of the relays (e.g., at 420 and 424) and a single wait period (e.g., at 422) to change the motor from a first rotational speed to a second rotational speed independent of the specific values of each rotational speed and the relays required to change between the rotational speeds. The resistance of resistors R366, R376 of the load control device 300 shown in FIG. 3 may be decreased to decrease the length of the wait time period $T_{WAIT}$ to decrease the time required to change between the rotational speeds.

Figure 5:
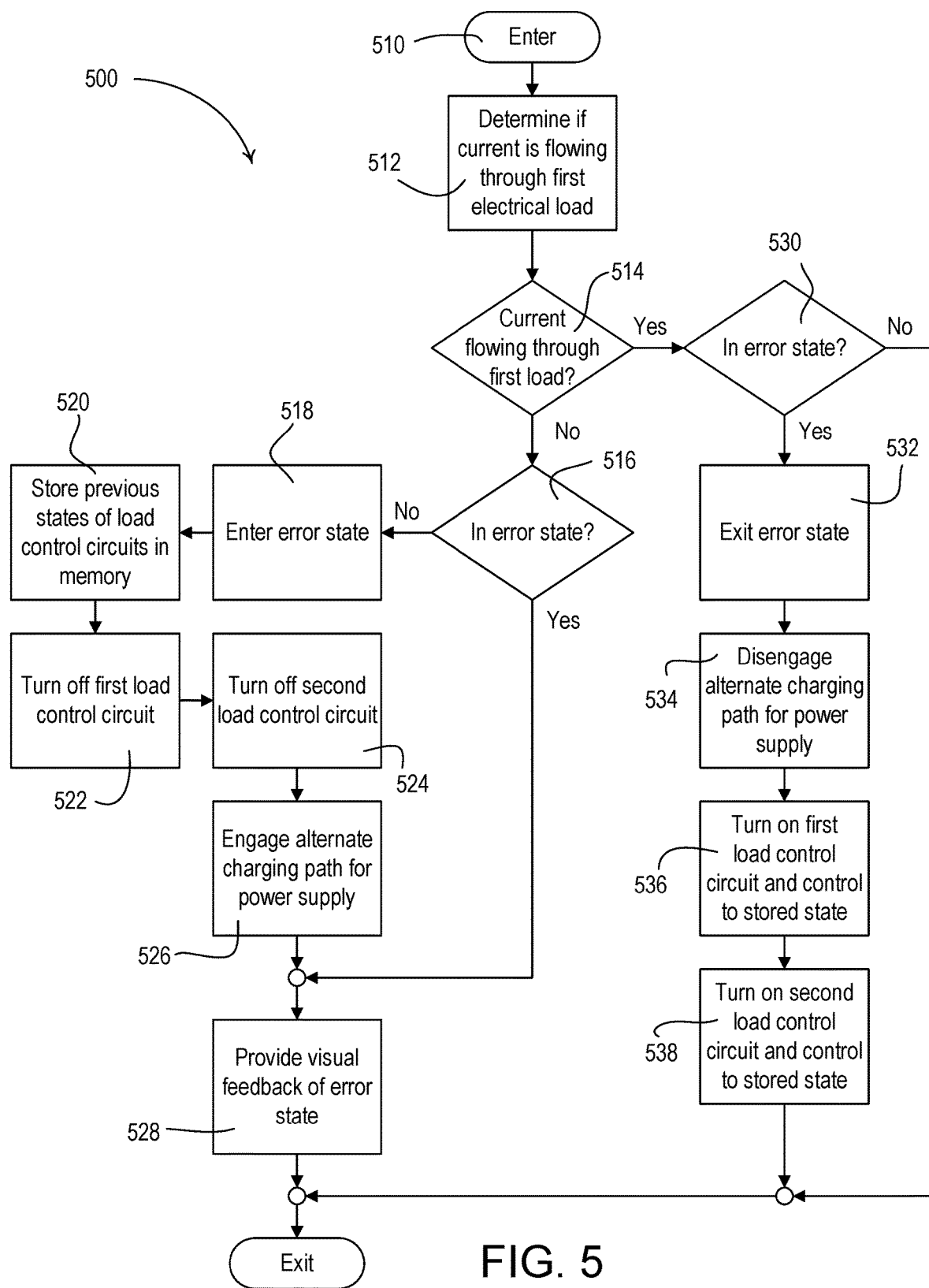
FIG. 5 is a simplified flowchart of an example fault mode procedure.

FIG. 5 is a simplified flowchart of an example fault mode procedure 500 that may be executed by a control circuit of a dual load control device (e.g., a control circuit of the dual load control device 120, the control circuit 214 of the load control device 200, and/or the control circuit 314 of the load control device 300). The dual load control device may comprise first and second load control circuits (e.g., the first and second load control circuits 210, 212, 310, 312) for controlling first and second electrical loads (e.g., a light source and a motor), respectively. The control circuit may execute the fault mode procedure 500 to enter an error state if the control circuit detects that current is not flowing through one of multiple electrical loads controlled by the load control device. For example, the control circuit may execute the fault mode procedure 500 periodically at 510.

The control circuit may first determine if current is flowing through the first electrical load at 512. For example, the control circuit may determine if zero-crossings were not detected for a predetermined number of half-cycles (e.g., four consecutive half-cycles). If current is not flowing through the first electrical load at 514 and the error state is not set yet at 516, the control circuit may enter the error state at 518 and store the previous states of the first and second load control circuits in memory at 520. The control circuit may turn off the first load control circuit at 522 (e.g., by rendering the FETs Q340, Q342 non-conductive) and turn off the second load control circuit at 524 (e.g., by controlling all of the relays 350, 360, 370 of the second load control circuit 310 to the second position Y). The control circuit may engage an alternate charging path for an internal power supply through the second electrical load at 526 (e.g., by controlling the relay 390 to position X). The control circuit may then provide visual feedback of the error state at 528 (e.g., by illuminating one or more of the visual indicators, such as the LEDs 220), before the fault mode procedure 500 exits. If the control circuit is in the error state at 516, the control circuit may simply continue to provide the visual feedback of the error state at 528 and the fault mode procedure 500 may exit.

If current is flowing through the first electrical load at 514 and the control circuit is in the error state at 530 (e.g., the light source has been re-installed in series with the first load control circuit and/or the fault condition has been resolved), the control circuit may exit the error state at 532 and disengage the alternate charging path for the internal power supply through the second electrical load at 534 (e.g., by controlling the relay 390 to position Y). At 536, the control circuit may turn on the first load control circuit and control the first load control circuit according to the previous state of the first load control circuit stored in the memory (e.g., as stored at 520). At 538, the control circuit may turn on the second load control circuit and control the second load control circuit according to the previous state of the second load control circuit stored in the memory (e.g., as stored at 520), before the fault mode procedure 500 exits. If current is flowing through the first electrical load at 514 and the control circuit is not in the error state at 530, the fault mode procedure 500 may simply exit.

Figure 6:
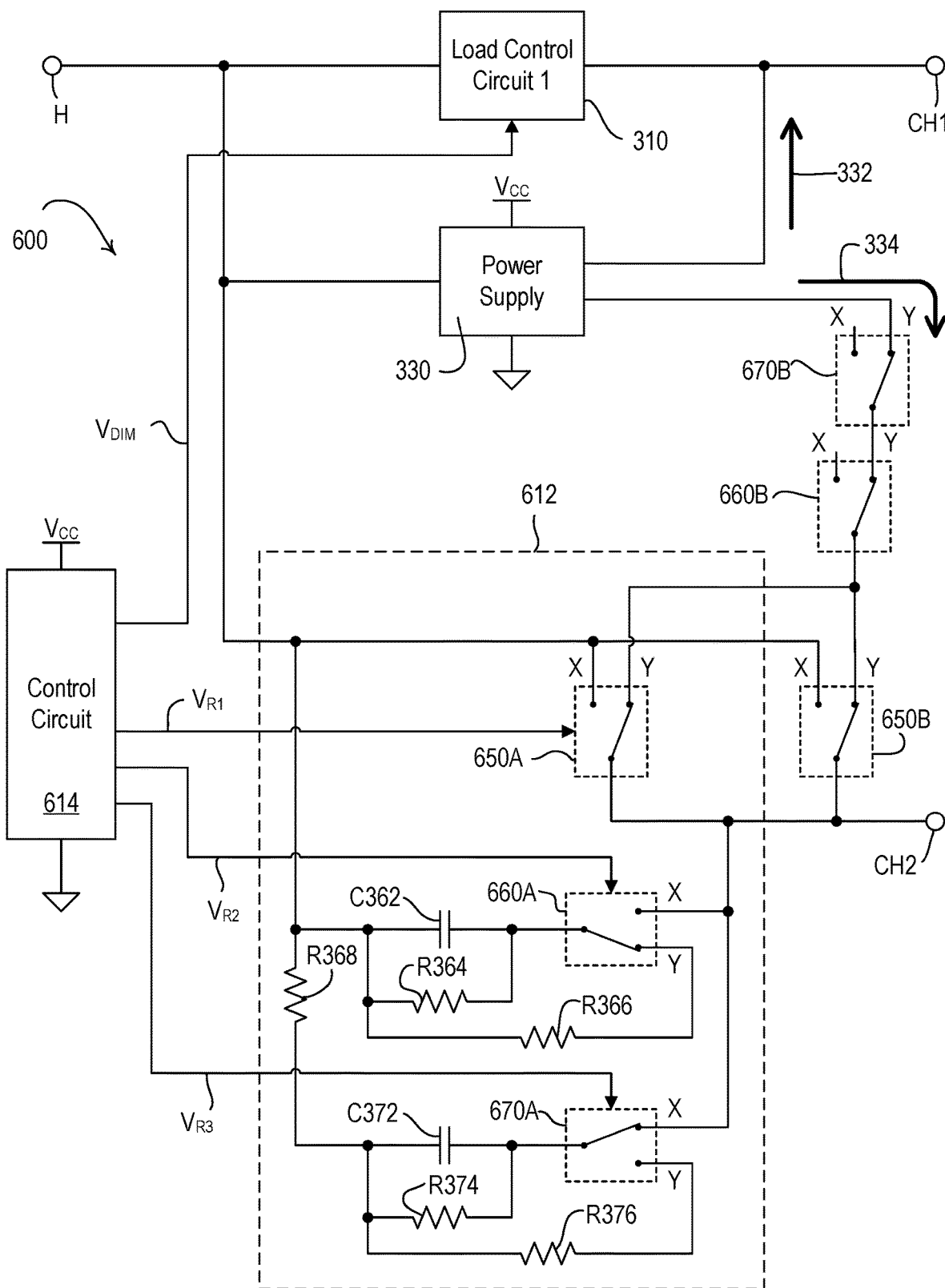
FIG. 6 is a simplified schematic diagram of another example dual load control device.

FIG. 6 is a simplified schematic diagram of another example load control device 600 (e.g., the dual load control device 120 of FIG. 1 and/or the load control device 200 of FIG. 2) for controlling the amount of power delivered to multiple electrical loads (e.g., a light source and a motor, respectively, of a ceiling fan). The load control device 600 may be similar to the load control device 300 shown in FIG. 3. However, the load control device 600 of FIG. 6 has three double-pole double-throw (DPDT) relays 650, 660, 670 rather than the SPDT relays 350, 360, 370, 390 of the load control device 300 shown in FIG. 3. The first DPDT relay 650 is illustrated by two separate SPDT switches 650A and 650B that are controlled between positions X and Y in response to a first relay control signal $V_{R1}$. The second DPDT relay 660 is illustrated by two separate SPDT switches 660A and 660B that are controlled between positions X and Y in response to a second relay control signal $V_{R2}$. The third DPDT relay 670 is illustrated by two separate SPDT switches 670A and 670B that are controlled between positions X and Y in response to a third relay control signal $V_{R3}$. The first, second, and third relay control signals $V_{R1}$, $V_{R2}$, $V_{R3}$ may be generated by a control circuit 614. The control circuit 614 may include one or more of a processor (e.g., a microprocessor), a microcontroller, a programmable logic device (PLD), a field programmable gate array (FPGA), an application specific integrated circuit (ASIC), or any suitable controller or processing device.

The load control device 600 may comprise a second load control circuit 612 that includes the first SPDT switches 650A, 660A, 670A of each of the DPDT relays 650, 660, 670. The first SPDT switch 650A of the first DPDT relay 650 may be coupled between the hot terminal H and the second controlled hot terminal CH2. When the first SPDT switch 650A of the first DPDT relay 650 is controlled to the first position X, the AC line voltage may be coupled across the second electrical load, such that the second electrical load is controlled to a full power level (e.g., the motor of the ceiling fan is controlled to a maximum rotational speed or full speed). The first SPDT switch 660A of the second DPDT relay 660 and the first SPDT switch 670A of the third DPDT relay 670 may be coupled in series with the first and second capacitor C362, C372, respectively. When the first SPDT switch 660A of the second DPDT relay 660 is controlled to the first position X, the first capacitor C362 may be coupled in series electrical connection between the AC power source and the second electrical load. When the first SPDT switch 670A of the third DPDT relay 670 is controlled to the first position X, the second capacitor C372 may be coupled in series electrical connection between the AC power source and the second electrical load. When the first SPDT switches 650A, 650A, 670A of all of the DPDT relays 650A, 660A, 670A are in position Y, the second electrical load may be controlled off.

The second SPDT switches 650B, 660B, 670B of each of the DPDT relays 650, 660, 670 may form a switching circuit for allowing the power supply 330 to conduct the charging current through the second electrical load. The second SPDT switches 650B, 660B, 670B of each of the DPDT relays 650, 660, 670 may be coupled between the power supply 330 and the second controlled hot terminal CH2 to provide the second charging path 334 through the second electrical load (e.g., when the second SPDT switches 650B, 660B, 670B are each in the second position Y). The first switch 650A of the first DPDT relay 650 may also be electrically connected so as to conduct the charging current through the second electrical load when in the second position Y (e.g., in parallel with the second switch 650B when in the second position Y). The second switch 650B of the first DPDT relay 650 may also be electrically connected so as to be coupled between the hot terminal H and the second controlled hot terminal CH2 when in the first position X (e.g., in parallel with the first switch 650A when in the first position X). When any of the first SPDT switches 650A, 650A, 670A of each of the DPDT relays 650, 660, 670 may be in the first position X (e.g., the second electrical load is on), the second SPDT switches 650B, 660B, 670B may also be in the first position X and the power supply 330 may not be able to charge through the second electrical load. When the first SPDT switches 650A, 650A, 670A of all of the DPDT relays 650A, 660A, 670A are in the second position Y (e.g., the second electrical load is off), the second SPDT switches 650B, 660B, 670B may also be in the second position Y and the power supply 330 may be able to charge through the second electrical load.

What is claimed is:

1. A load control device for controlling power delivered from an alternating-current (AC) power source to a motor load, the load control device comprising:
first and second capacitors;
first and second controllable switching circuits coupled in series with the first and second capacitors, respectively;
a control circuit configured to cause the motor load to rotate at first, second, and third rotational speeds by controlling the first and second controllable switching circuits to electrically couple the first capacitor, the second capacitor, and the parallel combination of the first and second capacitors, respectively, in series between the AC power source and the motor load;
a first resistor configured to be coupled in parallel with the first capacitor when the first capacitor is not electrically coupled between the AC power source and the motor load; and
a second resistor configured to be coupled in parallel with the second capacitor when the second capacitor is not electrically coupled between the AC power source and the motor load;
wherein the control circuit is configured to change the motor load from the first rotational speed to the second rotational speed by controlling the first controllable switching circuit to disconnect the first capacitor from the series electrical connection between the AC power source and the motor load at approximately a first zero-crossing of the AC power source, waiting for a wait time period to allow the first capacitor to discharge through the first resistor, and subsequently controlling the second controllable switching circuit to connect the second capacitor in series electrical connection between the AC power source and the motor load at approximately a second zero-crossing of the AC power source; and
wherein the control circuit is configured to change the motor load from the second rotational speed to the third rotational speed by controlling the first controllable switching circuit to disconnect the second capacitor from the series electrical connection between the AC power source and the motor load at approximately a third zero-crossing of the AC power source, waiting for the wait time period to allow the first capacitor to discharge through the second resistor, and subsequently controlling the first and second controllable switching circuits to connect the parallel combination of the first and second capacitors in series electrical connection between the AC power source and the motor load at approximately a fourth zero-crossing of the AC power source.

2. The load control device of claim 1, wherein the control circuit is configured to receive a first command for controlling the motor load to the second rotational speed and a second command for controlling the motor load to the third rotational speed.

3. The load control device of claim 2, wherein the control circuit is configured to wait for a timeout period after receiving the first command before changing the motor load to the third rotational speed in response to the second command.

4. The load control device of claim 2, further comprising:
one or more actuators configured to receive user inputs;
wherein the control circuit is configured to receive the first and second commands in response to actuations of the one or more actuators.

5. The load control device of claim 2, further comprising:
a communication circuit configured to receive signals;
wherein the control circuit is configured to receive the first and second commands via the signals received via the communication circuit.

6. The load control device of claim 1, wherein the control circuit is configured to change the motor load from the third rotational speed to the first rotational speed by controlling the first and second controllable switching circuits to disconnect the parallel combination of the first and second capacitors from the series electrical connection between the AC power source and the motor load at approximately a fifth zero-crossing of the AC power source, waiting for the wait time period to allow the first and second capacitors to discharge through the first and second resistors, respectively, and subsequently controlling the first controllable switching circuit to connect the first capacitor in series electrical connection between the AC power source and the motor load at approximately a sixth zero-crossing of the AC power source.

7. The load control device of claim 1, wherein the control circuit is configured to change the motor load from the third rotational speed to off by controlling the first and second controllable switching circuits to disconnect the parallel combination of the first and second capacitors from the series electrical connection between the AC power source and the motor load at approximately a fifth zero-crossing of the AC power source.

8. The load control device of claim 1, further comprising:
a third controllable switching circuit coupled in parallel electrical connection with the series combination of the first capacitor and the first switching circuit;
wherein the control circuit configured to control the third controllable switching circuit to electrically couple the AC power source to the motor load to cause the motor load to rotate at a maximum rotational speed.

9. The load control device of claim 1, wherein the first controllable switching circuit comprises a first single-pole double-throw relay having a movable contact electrically coupled to the first capacitor, the first capacitor coupled in series electrical connection between the AC power source and the motor load when the movable contact is connected to a first stationary contact of the relay, the first capacitor coupled in parallel electrical connection with the first resistor when the movable contact is connected to a second stationary contact of the relay.

10. The load control device of claim 1, further comprising:
a zero-cross detect circuit configured to generate a zero-cross detect signal that indicates zero-crossings of the AC power source;
wherein the control circuit is configured to control the first and second controllable switching circuits to connect and disconnect the respective capacitors from series electrical connection between the AC power source and the motor load at approximately zero-crossings of the AC power source in response to the zero-cross detect signal received from the zero-cross detect circuit.

11. The load control device of claim 1, wherein the first and second resistors are not coupled in parallel with the first and second capacitors, respectively, when the respective capacitor is electrically coupled in series between the AC power source and the motor load.

12. A method of controlling power delivered from an alternating-current (AC) power source to a motor load, the method comprising:

causing the motor to rotate at a first rotational speed by controlling a first controllable switching circuit to electrically couple a first capacitor in series between the AC power source and the motor load;

changing the motor load from the first rotational speed to a second rotational speed by controlling the first controllable switching circuit to disconnect the first capacitor from the series electrical connection between the AC power source and the motor load at approximately a first zero-crossing of the AC power source, connecting a first resistor in parallel with the first capacitor when the first capacitor is not connected in series between the AC power source and the motor load, waiting for a wait time period to allow the first capacitor to discharge through the first resistor, and subsequently controlling a second controllable switching circuit to connect a second capacitor in series electrical connection between the AC power source and the motor load at approximately a second zero-crossing of the AC power source to cause the motor to rotate at the second rotational speed; and changing the motor load from the second rotational speed to a third rotational speed by controlling the second controllable switching circuit to disconnect the second capacitor from the series electrical connection between the AC power source and the motor load at approximately a third zero-crossing of the AC power source, connecting a second resistor in parallel with the second capacitor when the second capacitor is not connected in series between the AC power source and the motor load, waiting for the wait time period to allow the second capacitor to discharge through the second resistor, and subsequently controlling the first and second controllable switching circuits to connect a parallel combination of the first and second capacitors in series electrical connection between the AC power source and the motor load at approximately a fourth zero-crossing of the AC power source to cause the motor to rotate at the third rotational speed.

13. The method of claim 12, further comprising:
receiving a first command for controlling the motor load to the second rotational speed;
wherein changing the motor load from the first rotational speed to the second rotational speed comprises changing the motor load from the first rotational speed to the second rotational speed in response to the first command.

14. The method of claim 13, further comprising:
receiving a second command for controlling the motor load to the third rotational speed;
wherein changing the motor load from the second rotational speed to the third rotational speed comprises changing the motor load from the second rotational speed to the third rotational speed in response to the second command.

15. The method of claim 14, further comprising:
waiting for a timeout period after receiving the first command before changing the motor load from the second rotational speed to the third rotational speed in response to the second command.

16. The method of claim 12, further comprising:
changing the motor load from the third rotational speed to the first rotational speed by controlling the first and second controllable switching circuits to disconnect the parallel combination of the first and second capacitors from the series electrical connection between the AC power source and the motor load at approximately a fifth zero-crossing of the AC power source;
waiting for the wait time period to allow the first and second capacitors to discharge through the first and second resistors, respectively; and
subsequently controlling the first controllable switching circuit to connect the first capacitor in series electrical connection between the AC power source and the motor load at approximately a sixth zero-crossing of the AC power source to cause the motor to rotate at the first rotational speed.

17. The method of claim 12, further comprising:
changing the motor load from the third rotational speed to off by controlling the first and second controllable switching circuits to disconnect the first and second capacitors, respectively, from the series electrical connection between the AC power source and the motor load at approximately a fifth zero-crossing of the AC power source; and
connecting the first and second resistors in parallel with the first and second capacitors, respectively, to allow the first and second capacitors to discharge through the first and second resistors.

18. The method of claim 12, further comprising:
controlling a third controllable switching circuit coupled in parallel electrical connection with the series combination of the first capacitor and the first switching circuit to electrically couple the AC power source to the motor load to cause the motor load to rotate at a maximum rotational speed.

19. The method of claim 12, further comprising:
generating a zero-cross detect signal that indicates zero-crossings of the AC power source; and
determining times of the first and second zero-crossings based on the zero-cross detect signal.

20. The method of claim 12, wherein the first resistor is not coupled in parallel with the first capacitor when the first capacitor is electrically coupled in series between the AC power source and the motor load.

* * * * *